(12) United States Patent
Sheng et al.

(10) Patent No.: US 10,825,112 B2
(45) Date of Patent: Nov. 3, 2020

(54) METHOD OF PREDICTING DISTRIBUTION NETWORK OPERATION RELIABILITY

(71) Applicant: CHINA ELECTRIC POWER RESEARCH INSTITUTE COMPANY LIMITED, Beijing (CN)

(72) Inventors: Wanxing Sheng, Beijing (CN); Yinglong Diao, Beijing (CN); Keyan Liu, Beijing (CN); Xiaoli Meng, Beijing (CN); Lijuan Hu, Beijing (CN); Kaiyuan He, Beijing (CN); Dongli Jia, Beijing (CN); Xueshun Ye, Beijing (CN); Weijie Dong, Beijing (CN); Jiangang Tang, Beijing (CN)

(73) Assignee: CHINA ELECTRIC POWER RESEARCH INSTITUTE COMPANY LIMITED, Beijing (CN)

( * ) Notice: Subject to any disclaimer, the term of this patent is extended or adjusted under 35 U.S.C. 154(b) by 347 days.

(21) Appl. No.: 15/752,030

(22) PCT Filed: Jun. 30, 2016

(86) PCT No.: PCT/CN2016/087815
§ 371 (c)(1),
(2) Date: Feb. 12, 2018

(87) PCT Pub. No.: WO2017/028632
PCT Pub. Date: Feb. 23, 2017

(65) Prior Publication Data
US 2018/0240202 A1      Aug. 23, 2018

(30) Foreign Application Priority Data

Aug. 19, 2015   (CN) .......................... 2015 1 0511780

(51) Int. Cl.
*G06Q 50/06* (2012.01)
*G06Q 10/04* (2012.01)
(Continued)

(52) U.S. Cl.
CPC ............. *G06Q 50/06* (2013.01); *G06F 17/18* (2013.01); *G06Q 10/04* (2013.01);
(Continued)

(58) Field of Classification Search
CPC .... G06Q 50/06; G06Q 10/04; G06Q 10/0635; H02J 3/00; H02J 13/0006; H02J 2203/20; G06F 17/18; G01W 1/10
See application file for complete search history.

(56) References Cited

U.S. PATENT DOCUMENTS 8,930,299 B2    1/2015  Pyle
9,484,747 B1 *  11/2016 Avritzer ................ G06N 7/005
(Continued)

FOREIGN PATENT DOCUMENTS

CN      102545214 A    7/2012
CN      103198235 A    7/2013
(Continued)

OTHER PUBLICATIONS

Wang, "A Process Level Network Traffic Prediction Algorithm Based on ARIMA Model in Smart Substation"., 2013 IEEE International Conference on Signal Processing, Communication and Computing (ICSPCC 2013). 2013., 5 Pages.*
(Continued)

*Primary Examiner* — Eunhee Kim
(74) *Attorney, Agent, or Firm* — Arent Fox LLP; Michael Fainberg

(57) ABSTRACT

A method of predicting the operation reliability of a distribution network, the method being based on an ARIMA model. By establishing an ARIMA model predict a user
(Continued)

monthly power outage count; convert a non-smooth element outage count time series to a smooth time series; perform regression on only lagged values of a dependent variable, and on current values and lagged values of a stochastic error term, so as to establish a user monthly power outage count model; according to a prediction result sample an outage point, and at the same time, taking into account a real time load operating state, establish a failure mode effects table based on TLOC criteria and PLOC criteria; and calculate a system recovery time for each instance of device outage, and finally obtain a whole-year reliability index.

8 Claims, 7 Drawing Sheets

(51) Int. Cl.
  *H02J 3/00* (2006.01)
  *G06Q 10/06* (2012.01)
  *G06F 17/18* (2006.01)
  *H02J 13/00* (2006.01)
  *G01W 1/10* (2006.01)
(52) U.S. Cl.
  CPC ............ *G06Q 10/0635* (2013.01); *H02J 3/00* (2013.01); *G01W 1/10* (2013.01); *H02J 13/0006* (2013.01); *H02J 2203/20* (2020.01)

(56) References Cited

U.S. PATENT DOCUMENTS

2012/0185414 A1  7/2012  Pyle
2017/0016430 A1*  1/2017  Swaminathan ........ G06Q 10/04

FOREIGN PATENT DOCUMENTS

CN    104318334 A    1/2015
CN    104766175 A    7/2015
CN    105069535 A    11/2015

OTHER PUBLICATIONS

Duan Wenkai et al, "Research on Data Preprocessing Technology Based on ARIMA Model", pp. 73-75, dated Mar. 31, 2015.
International Search Report in international application No. PCT/CN2016/087815, dated Sep. 22, 2016.
English Translation of the Written Opinion of the International Search Authority in international application No. PCT/CN2016/087815, dated Sep. 22, 2016.
Wang, Youchun et al., "Study on Microgrid Short-term Load Combination Forecasting Based on ARIMA-SVM Model", Shaanxi Electric Power, vol. 42, No. 3, Dec. 31, 2014 (Dec. 31, 2014), ISSN:1673-7598, pp. 19-23, dated Dec. 31, 2014.

* cited by examiner

METHOD OF PREDICTING DISTRIBUTION NETWORK OPERATION RELIABILITY

CROSS-REFERENCE TO RELATED APPLICATIONS

This application is the U.S. National Stage Application of International Patent Application No. PCT/CN2016/087815, filed on Jun. 30, 2016, which claims priority to Chinese Patent Application No. 201510511780.0, filed on Aug. 19, 2015, the contents of each of which is incorporated herein by reference in its entirety.

TECHNICAL FIELD

The disclosure relates to the field of assessment of operation reliability of power distribution networks, and particularly to a method for predicting reliability of operation of a power distribution network.

BACKGROUND

A power distribution network is located at the end of a power system, and is directly connected with a user to realize an electric energy distribution function. Large-scale and long-term power outage not only causes huge loss, but also threatens the social order. Reliability of the power distribution network has a direct influence on whether the user may obtain qualified electric energy or not. Therefore, a power company keeps improving power supply quality and an uninterruptible power supply capability to reduce a probability of power outage of a power grid within a reasonable investment range.

A power distribution network is complex and large in structure, includes various equipment, and is formed by connecting a large number of components such as power points, loads, transformers, switches and various types of primary and secondary equipment through overhead lines and cables. The network structure frequently changes due to failures, load transfer or operation regulation, which causes complex shutdown models of some equipment of the power distribution network, relatively stronger dynamic characteristics of a system and changing failure consequences and brings difficulties to real-time reliability assessment of the power distribution network during operation. Existing methods for assessing reliability of the power distribution network may mainly be divided into two types, i.e., conventional parsing method-based power distribution network reliability assessment and Monte Carlo sampling-based reliability assessment. Conventional parsing method-based power distribution network reliability assessment describes reliability relationships between the components and the system by virtue of a mathematical model, inputs whole-process service lives of the components and the system to calculate a final reliability index, and mainly includes a failure mode consequence analysis method, a minimal path algorithm, a network equivalent method, a feeder partitioning algorithm, a parsing method has a strict mathematical logic, but time complexity is exponentially increased along with expansion of a system model. Power distribution network reliability assessment based on a simulation algorithm such as Monte Carlo adopts a probability and statistics theory as a mathematical foundation, and assesses system reliability by virtue of a computer sampling method, and because a sampling algorithm is based on the law of large numbers, a sample variance is excessively large under the condition of relatively fewer system components or relatively lower failure frequency, which makes a final result inaccurate. Operation reliability assessment is different from plan and design reliability assessment, and with wide coverage of measurement equipment, there is detailed statistical data and real-time operation and maintenance strategies during operation of the power distribution network, not only may average failure rates and repair rates of the components be provided, but also repair time, power wheeling solutions, real-time/historical remote signaling and remote measurement quantities, historical power outage data may be provided, Second, in a practical production link, state changes of the system are memorable, that is, time of appearance of events do not meet an exponential distribution, and shutdown events of the equipment and the components occur not independently but with certain relevance. Moreover, a reliability index is substantially a random variable determined by multiple related factors such as a network topology, an operation manner, a system load and random shutdown and random repair of the components, and is still uncertain as feedback information.

In view of the above, how to implement accurate prediction and assessment of reliability of a power distribution network by well utilizing historical or real-time data becomes a problem currently urgent to be solved.

SUMMARY

In view of this, embodiments of the disclosure are expected to provide a method for predicting reliability of operation of a power distribution network, which may effectively and accurately guide planning, design, operation and maintenance of the power distribution network in the future, improve operation reliability prediction and assessment accuracy of the power distribution network, implement safe and stable operation of the power distribution network, reduce a power outage frequency and narrow a power outage range.

The purpose of the disclosure is achieved by the following technical solution.

A method for predicting reliability of operation of a power distribution network is provided, which is based on an Autoregressive Integrated Moving Average (ARIMA) model, the method including:

step 1 of monthly power outage frequencies of users in historical data of a power distribution network system are extracted and preprocessed to obtain a monthly average power outage frequency sequence within a time period;

step 2 of whether the monthly average power outage frequency sequence is a stationary sequence or not is judged, step 4 is executed when the monthly average power outage frequency sequence is a stationary sequence, and step 3 is executed when the monthly average power outage frequency sequence is not a stationary sequence;

step 3 of the monthly average power outage frequency sequence is corrected, and Step 2 is re-executed;

step 4 of a value of a total number of autoregressive items and a value of a total number of moving average items of ARIMA are obtained according to the monthly average power outage frequency sequence;

step 5 of the ARIMA model is established and corrected; and step 6 of a monthly power outage frequency of the power distribution network system in a recent year is predicted according to the ARIMA model, and an operation reliability index of the power distribution network in the whole year is obtained.

In an embodiment, the step 1 includes:

step 1-1 of a monthly power outage frequency sequence Y of the users in the historical data of the power distribution network is extracted; and step 1-2 of the monthly power outage frequency sequence Y is preprocessed to obtain the monthly average power outage frequency sequence $Y_t$ within the time period:

$$Y_t = \phi_1 Y_{t-1} + \phi_2 Y_{t-2} + \ldots + \phi_p Y_{t-p} + e_t - \theta_1 e_{t-1} - \theta_2 e_{t-2} - \ldots - \theta_q e_{t-q} \quad (1),$$

where $Y_t$ is a monthly average power outage frequency sequence value of moments 0 to t, p is the total number of the autoregressive items of the model, q is the total number of moving average items of the model, e is white noise during each sequence change, $\phi$ and $\theta$ are different unknown parameters to be solved and is a month number in a calculation window.

In an embodiment, the step 2 includes that:

whether the monthly average power outage frequency sequence is a stationary sequence or not is judged according to a formula (2) and a formula (3):

$$A_n = \frac{\sum_{i=0}^{n} y_i}{n} = K, \text{ and} \quad (2)$$

$$\gamma_{t,t-k} \approx \gamma_{0,k}, \quad (3)$$

where $A_n$ is a constant and represents an average value of the monthly power outage frequencies, $\gamma_{t,t-k} \approx \gamma_{0,k}$ represents that covariances of sequences $Y_{t-k}$ and $Y_t$ and sequences Y and $Y_k$ are approximate, k is a parameter k making the formula (3) true at any moment, K represents a constant and t is the month number in the calculation window;

the step 4 is executed when both the formula (2) and the formula (3) are true; and the step 3 is executed when any one of the formula (2) and the formula (3) is false.

In an embodiment, a method for correcting the monthly average power outage frequency sequence in the step 3 is to modify a time frequency of the monthly average power outage frequency sequence or perform logarithmic differentiation on the monthly average power outage frequency sequence.

In an embodiment, the step 4 includes:

step 4-1 of an autocorrelation function and partial autocorrelation function of the monthly average power outage frequency sequence are established;

step 4-2 of the autocorrelation function and partial autocorrelation function of the monthly average power outage frequency sequence are solved to obtain a set of the value of the total number of the autoregressive items and the value of the total number of moving average items of the ARIMA model;

step 4-3 of an Akaike Information Criterion (AIC) function is established:

$$AIC = n \log \sigma^2 + 2(p+q) \quad (4),$$

where n is a sample number of monthly average power outage, $\sigma$ is a residual square sum, p is the total number of the autoregressive items of the model and q is the total number of moving average items of the model; and step 4-4 of $p_m$ and $q_m$ making a value of AIC minimum are screened as final values of the total number p of the autoregressive items and the total number q of moving average items, $p_m$ being a certain value in the value set of the total number p of the autoregressive items and $q_m$ being a certain value in the value set of the total number q of moving average items.

In an embodiment, the step 5 includes:

step 5-1 of regression analysis is performed on the value of the total number of the autoregressive items and the value of the total number of moving average items according to a least square method to obtain a prototype of the ARIMA model; and step 5-2 of a residual sequence of the prototype is detected, when the residual sequence is white noise, it is determined that the prototype is a final type of the ARIMA model and establishment of the ARIMA model is completed, and when the residual sequence is not the white noise, 5-1 is re-executed.

In an embodiment, the step 6 includes:

step 6-1 of the monthly power outage frequency of the power distribution network system in the recent year is predicted and extracted according to the ARIMA model, and a historical failure information sample set is created;

step 6-2 of a Laplace smoothing failure component sample set is created according to the historical failure information sample set, and power outage frequencies, power outage time and energy not supplied of de-energized load points are obtained; and step 6-3 of the operation reliability index of the power distribution network in the whole year is obtained.

In an embodiment, the step 6-1 includes:

step a of the power distribution network system is partitioned on the basis of a Total Loss Of Continuity (TLOC) criterion and Partial Loss Of Continuity (FLOC) criterion of a real-time operation condition of the power distribution network system, and a Failure Mode and Effects Analysis (FMEA) table is created; and step b of the ARIMA model is solved to obtain the predicted monthly power outage frequency of the power distribution network system in the whole year, and the historical failure information sample set is created.

In an embodiment, the step 6-2 includes:

step c: the Laplace smoothing failure component sample set Re $s_1(e,w)$ is created according to the historical failure information sample set, wherein it is assumed that a component sample set is E and a historical failure set is S, and then the failure component sample set Re $s_1(e,w)$ is created according to the following rule:

for a certain component $e_i$, if a frequency of appearance in the historical failure set S is $w_i$ and does not change, the following formula is true:

$$w_i = \begin{cases} \min(w') - 1 & \text{if } \min(w') \geq 1 \\ 1 & \text{if } \min(w') > 1 \end{cases}, \quad (5)$$

where w' is a frequency of all e∈S components, min(w') represents a minimum value of the frequency of appearance of e therein, e represents a failure component and w represents a failure probability weight;

step d of each power outage event in the failure component sample set is cyclically read, and a corresponding failure component is simultaneously extracted from the failure component sample set;

step e of the FMEA table is read and looked up for the de-energized load point influenced when the failure component corresponding to the power outage event fails;

step f of the power outage frequency, power outage time and energy not supplied of the de-energized load point are recorded; and step g of whether all power outage events in the failure component sample set are cyclically completed or not is judged, the step 6-3 is executed when all power outage events in the failure component sample set are cyclically completed, and the step d is re-executed when all power outage events in the failure component sample set are not cyclically completed.

In an embodiment, the step 6-3 includes:

step h of statistics on the power outage frequency, power outage time and energy not supplied of each de-energized load point is made; and step i of the operation reliability index of the power distribution network system in the whole year, i.e. the reliability index of the whole power distribution network system, is calculated.

From the technical solution, it can be seen that the disclosure provides the method for predicting the operation reliability of the power distribution network on the basis of the ARIMA model. The ARIMA model is established to predict the monthly power outage frequencies of the users, a nonstationary component failure frequency time sequence is converted into a stationary time sequence, and then a lagged value of a dependent variable and a present value and lagged value of a random error item are regressed to establish a model for the monthly power outage frequencies of the users; shutdown points are sampled according to a prediction result, and meanwhile, the FMEA table is created on the basis of the TLOC criterion and the PLOC criterion in consideration of a real-time load operation condition; and system recovery time after every equipment shutdown is calculated to finally obtain the reliability index in the whole year. According to the prediction method disclosed in the disclosure, a real-time operation state and regulation strategy of the power distribution network are comprehensively considered, system risk characteristics in the historical data are deeply mined, planning, design, operation and maintenance of the power distribution network in the future are effectively and accurately guided, operation reliability prediction and assessment accuracy of the power distribution network is improved, safe and stable operation of the power distribution network is implemented, a power outage frequency is reduced, a power outage range is narrowed, a link weak for reliability in the system is strengthened, an effective improvement measure is proposed, statistical characteristics and development regularity of internal risks of the system may be accurately mined, and a trend, seasonality and periodicity of the reliability of the power distribution network are highlighted.

Compared with a closest conventional art, the technical solution provided by the embodiment of the disclosure has the following beneficial effects.

1: in the technical solution provided by the embodiments of the disclosure, an ARIIVIA method is adopted to assess the operation reliability of the power distribution network, the real-time operation state and regulation strategy of the power distribution network are comprehensively considered, the system risk characteristics in the historical data are deeply mined, planning, design, operation and maintenance of the power distribution network in the future are effectively and accurately guided, and the operation reliability prediction and assessment accuracy of the power distribu-tion network is improved.

2: according to the technical solution provided by the embodiments of the disclosure, considering the historical data and the real-time operation condition may truthfully reflect influence of dynamic changes of loads and network structure in the system on the reliability of the power distribution network, an algorithm is efficient, and influence of excessive data noise on accuracy of the result is avoided.

3: according to the technical solution provided by the embodiments of the disclosure, prediction about a power outage frequency of the system is implemented by a scientific and effective short-term prediction method, the statistical characteristics and development regularity of the internal risks of the system may be accurately mined, and the trend, seasonality and periodicity of the reliability of the power distribution network are highlighted.

4: the technical solution provided by the embodiments of the disclosure is widely applied, and has remarkable social benefits and economic benefits.

DETAILED DESCRIPTION

The technical solution in the embodiments of the disclosure will be clearly and completely described below in combination with the drawings in the embodiments of the disclosure. Obviously, the described embodiments are not all embodiments but only part of embodiments of the disclosure. All other embodiments obtained by those skilled in the art on the basis of the embodiments of the disclosure without creative work fall within the scope of protection of the disclosure.

Figure 1:
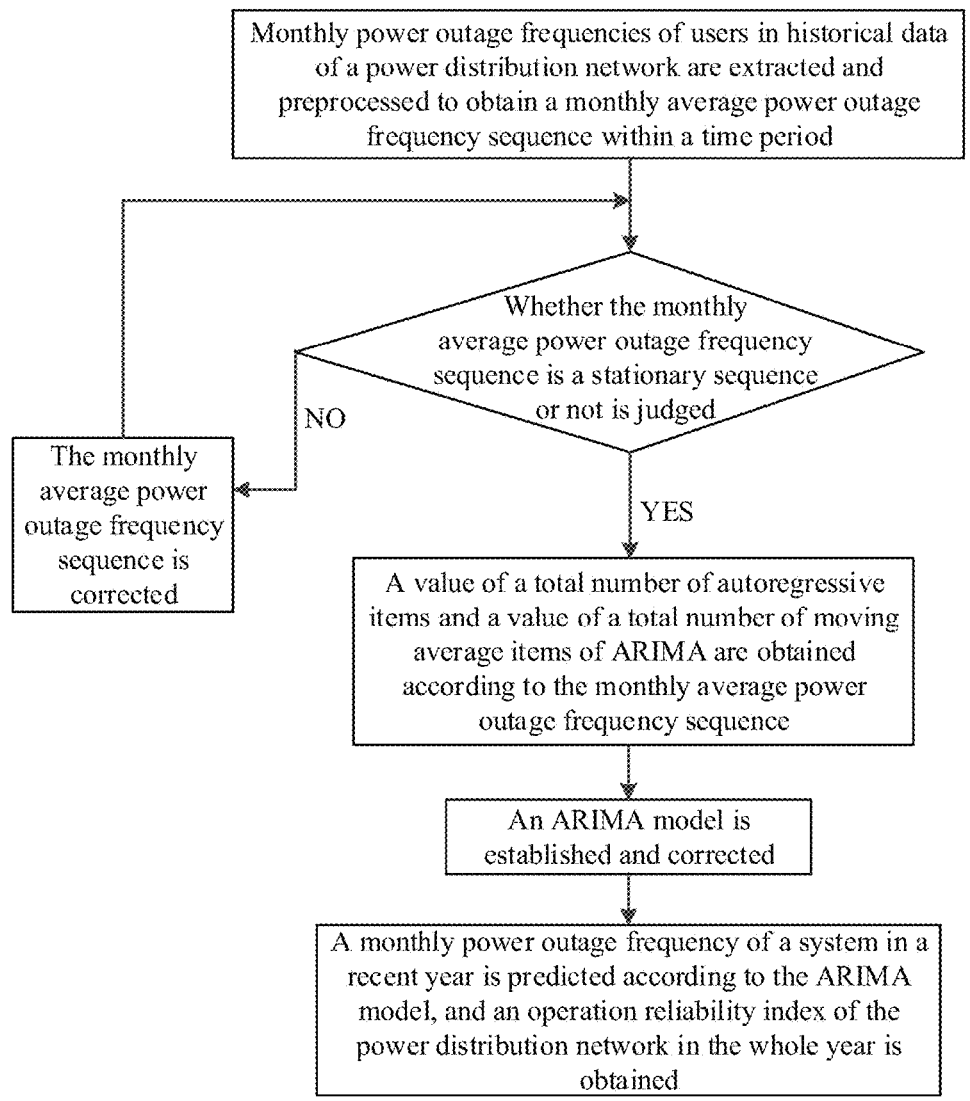
FIG. 1 is a flowchart of a method for predicting reliability of operation of a power distribution network according to an embodiment of the disclosure.

As shown in FIG. 1, an embodiment of the disclosure provides a method for predicting reliability of operation of a power distribution network. The method is based on an ARIMA model, and historical power outage frequencies of users are determined as input of the ARIMA model to predict a reliability index in a next year. Since a complex power distribution network includes relatively more nodes, the monthly power outage frequencies are relatively more correlated with time-related attributes such as load changes, seasons and weather, load prediction and weather prediction may both be solved by virtue of the ARIMA model and an autocorrelation coefficient obtained after practical production data result-based differentiation or frequency modulation is also larger than 0 and 5, solving the monthly power outage frequencies with a time sequence model is scientific.

The method includes the following steps.

In step 1, monthly power outage frequencies of users in historical data of a power distribution network are extracted and preprocessed to obtain a monthly average power outage frequency sequence within a time period.

In step 2, whether the monthly average power outage frequency sequence is a stationary sequence or not is judged.

Step 4 is executed when the monthly average power-outage frequency sequence is a stationary sequence.

Step 3 is executed when the monthly average power outage frequency sequence is not a stationary sequence.

In step 3, the monthly average power outage frequency sequence is corrected, and Step 2 is re-executed.

In step 4, a value of a total number of autoregressive items and a value of a total number of moving average items of ARIMA are obtained according to the monthly average power outage frequency sequence.

In step 5, the ARIMA model is established and corrected, wherein the ARIMA model is also called as a box-jenkins model and a box-jenkins method, wherein ARIMA(p,d,q) is called as an ARIMA model, AR is autoregressive, p is an autoregressive item, MA is moving average, q is a total number of moving average items, and d is a number of times of differentiation performed when a time sequence gets stationary. The ARIMA model refers to a model established by converting a nonstationary time sequence into a stationary time sequence and then regressing a lagged value of a dependent variable and a present value and lagged value of a random error item. The ARIMA model includes an MA process, an AR process, an Autoregressive Moving Average (ARMA) process and an ARIMA process according to whether an original sequence is stationary or not and different parts included in regression.

In step 6, a monthly power outage frequency of a system in a recent year is predicted according to the ARIMA model, and an operation reliability index of the power distribution network in the whole year is obtained.

Figure 2:
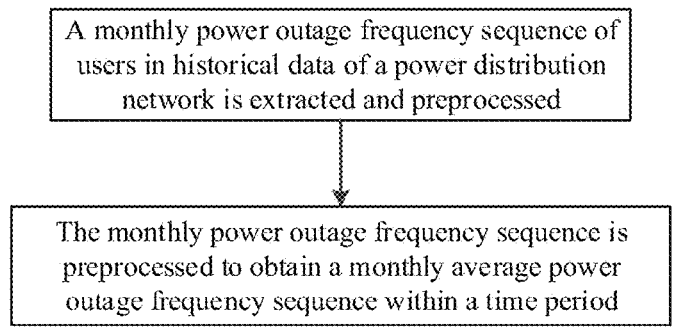
FIG. 2 is a flowchart of step 1 in a prediction method according to an embodiment of the disclosure.

As shown in FIG. 2, the step 1 includes the following steps.

In step 1-1, a monthly power outage frequency sequence Y of the users in the historical data of the power distribution network is extracted.

In step 1-2, the monthly power outage frequency sequence Y is preprocessed to obtain the monthly average power outage frequency sequence $Y_t$ within the time period:

$$Y_t = \phi_1 Y_{t-1} + \phi_2 Y_{t-2} + \ldots + \phi_p Y_{t-p} + c_t - \theta_1 c_{t-1} - \theta_2 c_{t-2} - \ldots - \theta_q c_{t-q} \quad (1),$$

where $Y_t$ is a monthly average power outage frequency sequence value of moments 0 to t, p is the total number of the autoregressive items of the model, q is the total number of moving average items of the model, is white noise during each sequence change, $\phi$ and $\theta$ are different unknown parameters to be solved and t is a month number in a calculation window.

The step 2 includes that:

whether the monthly average power outage frequency sequence is a stationary sequence or not is judged according to a formula (2) and a formula (3):

$$A_n = \frac{\sum_{i=0}^{n} y_i}{n} = K, \text{ and} \quad (2)$$

$$\gamma_{t,t-k} \approx \gamma_{0,k}. \quad (3)$$

Step 4 is executed when both the formula (2) and the formula (3) are true.

Step 3 is executed when any one of the formula (2) and the formula (3) is false.

In the formulae, $A_n$ is a constant and representing an average value of the monthly power outage frequencies, $\theta_{t,t-k} \approx \gamma_{0,k}$ represents that covariances of sequences $Y_{t-k}$ and $Y_t$ and sequences Y and $Y_k$ are approximate, k is a parameter k making the formula (3) true at any moment, K represents a constant and t is the month number in the calculation window.

A method for correcting the monthly average power outage frequency sequence in step 3 is to modify a time frequency of the monthly average power outage frequency sequence or perform logarithmic differentiation on the monthly average power outage frequency sequence.

Figure 3:
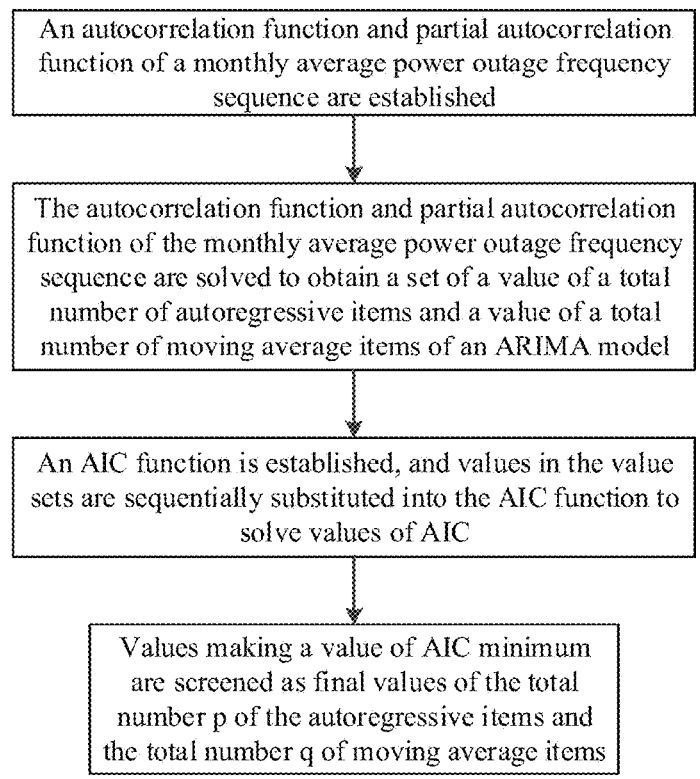
FIG. 3 is a flowchart of step 4 in a prediction method according to an embodiment of the disclosure.

As shown in FIG. 3, step 4 includes the following steps.

In step 4-1, an autocorrelation function and partial autocorrelation function of the monthly average power outage frequency sequence are established.

In step 4-2, the autocorrelation function and partial autocorrelation function of the monthly average power outage frequency sequence arc solved to obtain a set of the value of the total number of the autoregressive items and the value of the total number of moving average items of the ARIMA model.

In step 4-3, an AIC function is established, and values in the value sets are sequentially substituted into the AIC function to solve values of AIC:

$$\text{AIC} = n \log \sigma^2 + 2(p+q) \quad (4),$$

in the formula, n is a sample number of monthly average power outage, $\sigma$ is a residual square sum, p is the total number of the autoregressive items of the model and q is the total number of moving average items of the model.

In step 4-4, $p_m$ and $q_m$ making a value of AIC minimum are screened as final values of the total number p of the autoregressive items and the total number q of moving average items.

Figure 4:
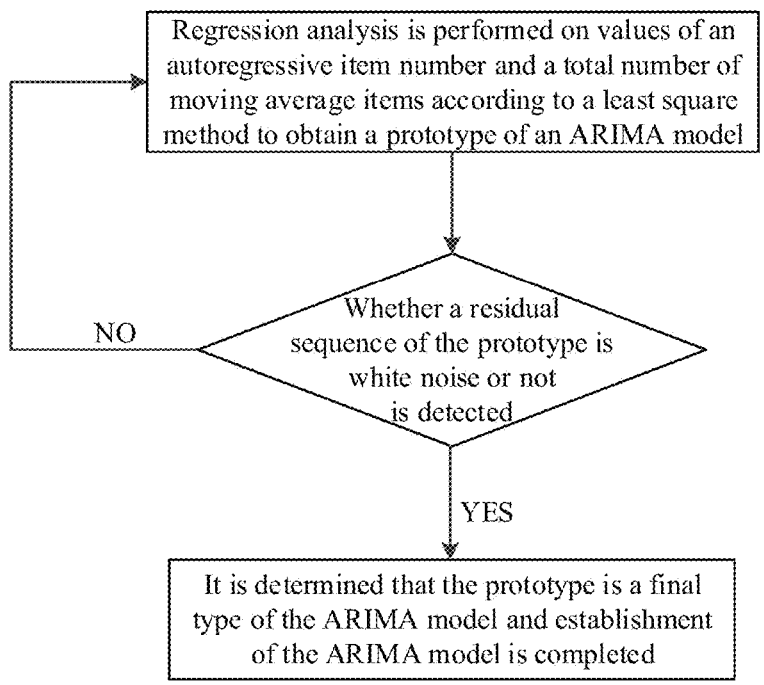
FIG. 4 is a flowchart of step 5 in a prediction method according to an embodiment of the disclosure.

As shown in FIG. 4, Step 5 includes the following steps.

In step 5-1, regression analysis is performed on the value of the total number of the autoregressive items and the value of the total number of moving average items according to a least square method to obtain a prototype of the ARIMA model.

In step 5-2, a residual sequence of the prototype is detected.

When the residual sequence is white noise, it is determined that the prototype is a final type of the ARIMA model and establishment of the ARIMA model is completed.

When the residual sequence is not the white noise, the step 5-1 is re-executed.

Figure 5:
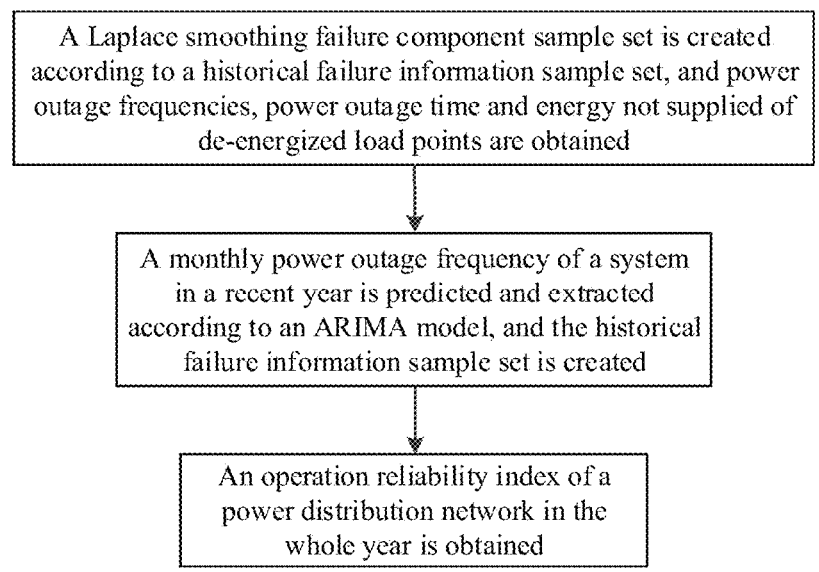
FIG. 5 is a flowchart of step 6 in a prediction method according to an embodiment of the disclosure.

As shown in FIG. 5, the step 6 includes the following steps.

In the step 6-1, the monthly power outage frequency of the system in the recent year is predicted and extracted according to the ARIMA model, and a historical failure information sample set is created, including the following steps:

in step a, a prediction system of the power distribution network is partitioned on the basis of a TLOC criterion and PLOC criterion of a real-time operation condition of the system, and an FMEA table is created, the TLOC criterion being a total loss of continuity criterion and the PLOC criterion being a partial loss of continuity criterion; and in step b, the ARIMA model is solved to obtain the predicted monthly power outage frequency of the system in the whole year, and the historical failure information sample set is created.

In the step 6-2, a Laplace smoothing failure component sample set is created according to the historical failure information sample set, and power outage frequencies, power outage time and energy not supplied of de-energized load points are obtained, including the following steps:

in step c, the Laplace smoothing failure component sample set Re $s_1(e,w)$ is created according to the historical failure information sample set, wherein a solving process of Re $s_1(e,w)$ is as follows: sampling is performed in the historical failure information sample set, if a sampling frequency of each piece of equipment is 0, a minimum value is assigned, otherwise the sampling frequency of the equipment is increased, to form the set Re $s_1(e,w)$, it is assumed that a component sample set is E and a historical failure set is S, and then the failure component sample set Re $s_1(e,w)$ is created according to the following rule:

for a certain component $e_i$, if a frequency of appearance in the historical failure set S is $w_i$ and does not change, the following formula is true:

$$w_i = \begin{cases} \min(w') - 1 & \text{if } \min(w') \geq 1 \\ 1 & \text{if } \min(w') > 1 \end{cases} \quad (5)$$

in the formula, w' is a frequency of all e∈S components, min(w') represents a minimum value of the frequency of appearance of e therein, e represents a failure component and w represents a failure probability weight;

in step d, each power outage event in the failure component sample set is cyclically read, and a corresponding failure component is simultaneously extracted from the failure component sample set;

in step e, the FMEA table is read and looked up for the de-energized load point influenced when the failure component corresponding to the power outage event fails;

in step f, the power outage frequency, power outage time and energy not supplied of the de-energized load point are recorded; and in step g, whether all power outage events in the failure component sample set are cyclically completed or not is judged.

Step 6-3 is executed when all power outage events in the failure component sample set are cyclically completed.

Step d is re-executed when all power outage events in the failure component sample set are not cyclically completed.

In step 6-3, the operation reliability index of the power distribution network in the whole year is obtained, including the following steps:

in step h, statistics on the power outage frequency, power outage time and energy not supplied of each de-energized load point is made; and in step i, the operation reliability index of the power distribution network system in the whole year, i.e. the reliability index of the whole system, is calculated.

Figure 6:
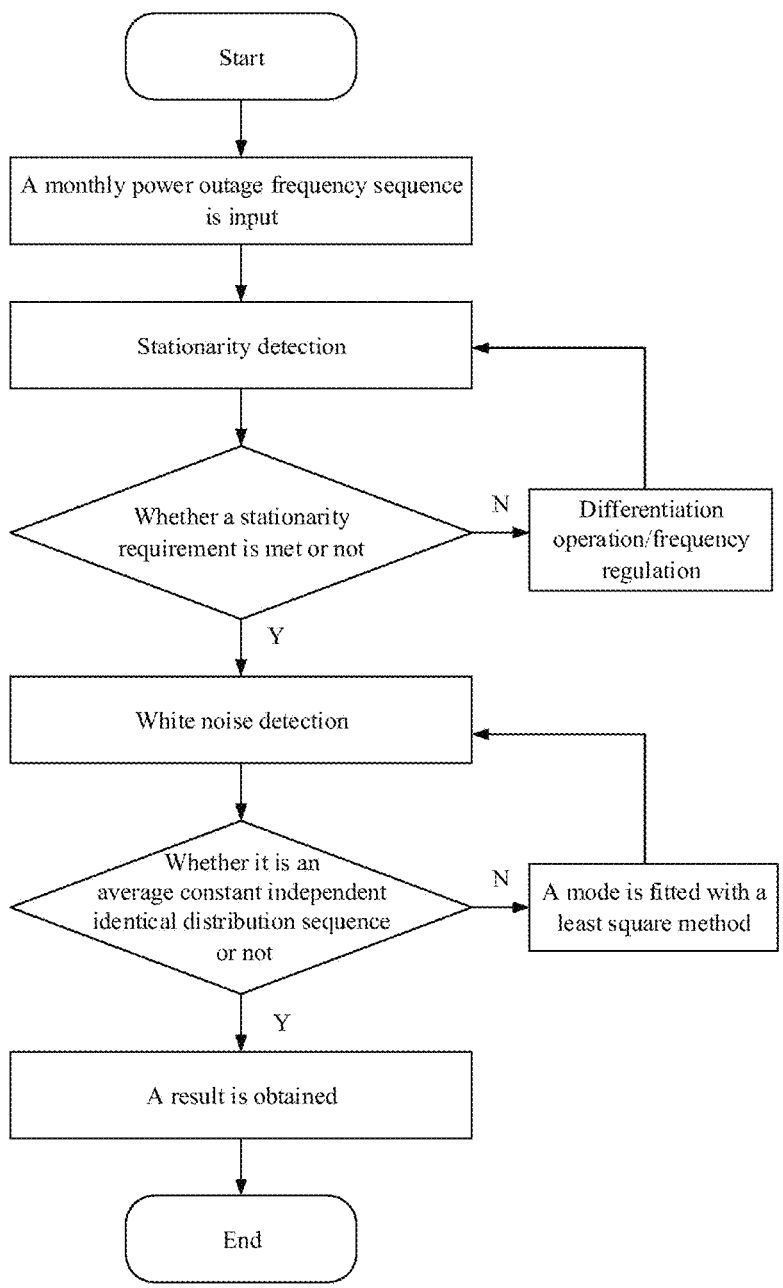
FIG. 6 is a flowchart of an application example of a prediction method according to an embodiment of the disclosure.

As shown in FIG. 6, an embodiment of the disclosure provides an application example of a method for predicting reliability of operation of a power distribution network. Historical power outage frequencies of users are determined as input of an ARIMA model to predict a reliability index in a next year. Since a complex power distribution network includes relatively more nodes, the monthly power outage frequencies are relatively more correlated with time-related attributes such as load changes, seasons and weather, load prediction and weather prediction may both be solved by virtue of the ARIMA model and an autocorrelation coefficient obtained after practical production data result-based differentiation or frequency modulation is also larger than 0 and 5, solving the monthly power outage frequencies with a time sequence model is scientific. The disclosure includes two key steps of establishing the ARIMA model and calculating the reliability index on the basis of historical failure set sampling. Specific steps are as follows.

In step 1, preprocessing of time sequence analysis is performed: a period of a time sequence is determined to be a month, monthly power outage frequency observed values of users are extracted from historical data to form a sequence Y, and an autoregressive moving model is established:

$$Y_t = \phi_1 Y_{t-1} + \phi_2 Y_{t-2} + \ldots + \phi_p Y_{t-p} + e_t - \theta_1 e_{t-1} - \theta_2 e_{t-2} - \ldots - \theta_q e_{t-q} \quad (2),$$

in the formula, $Y_t$ being a monthly average power outage frequency sequence value of moments 0 to t, p being an autoregressive item number of the model, q being a total number of moving average items of the model and e being white noise during each sequence change.

In step 2, whether the time sequence formed by the monthly power outage frequencies of the users meets a stationary condition, i.e. the following formulae, or not is detected:

$$A_n = \frac{\sum_{i=0}^{n} y_i}{n} = K, \text{ and} \quad (3)$$

$$\gamma_{t,t-k} \approx \gamma_{0,k}, \quad (4)$$

where $A_n$ represents an average value of the monthly power outage frequencies in (3) is a constant, and the formula (4) represents that, for any moment t, covariances of sequences $Y_{t-k}$ and $Y_t$ and sequences Y and $Y_k$ are approximate.

In the step 3, an order range of the ARIMA model is calculated on the basis of an autocorrelation function and partial correlation function of the stationary time sequence at first, and then its AIC values are calculated from low to high orders respectively, that is, the order making AIC minimum is determined by virtue of an AIC. An AIC function is defined as follows:

$$\text{AIC} = n \log \sigma^2 + 2(p+q) \quad (5),$$

in the formula, n is a power outage sample number, σ is a residual square sum and p and q are the orders of the ARIMA model.

In the sep 4, regression analysis is performed by virtue of a least square method on the basis of the model order determined in Step 3, the ARIMA model is fitted, whether a residual sequence of the model is white noise or not is simultaneously detected, and if NO, regression analysis is continued.

In the step 5, a monthly power outage frequency of the system in a recent year is predicted by virtue of the generated ARIMA model, historical failure information of the system is extracted to create a failure point sample set by virtue of Laplace smoothing, each power outage event is cyclically read, sampling is performed to calculate failure recovery time, failure isolation time and load wheeling time after each power outage event, and the reliability index in the whole year is finally obtained.

Figure 7:
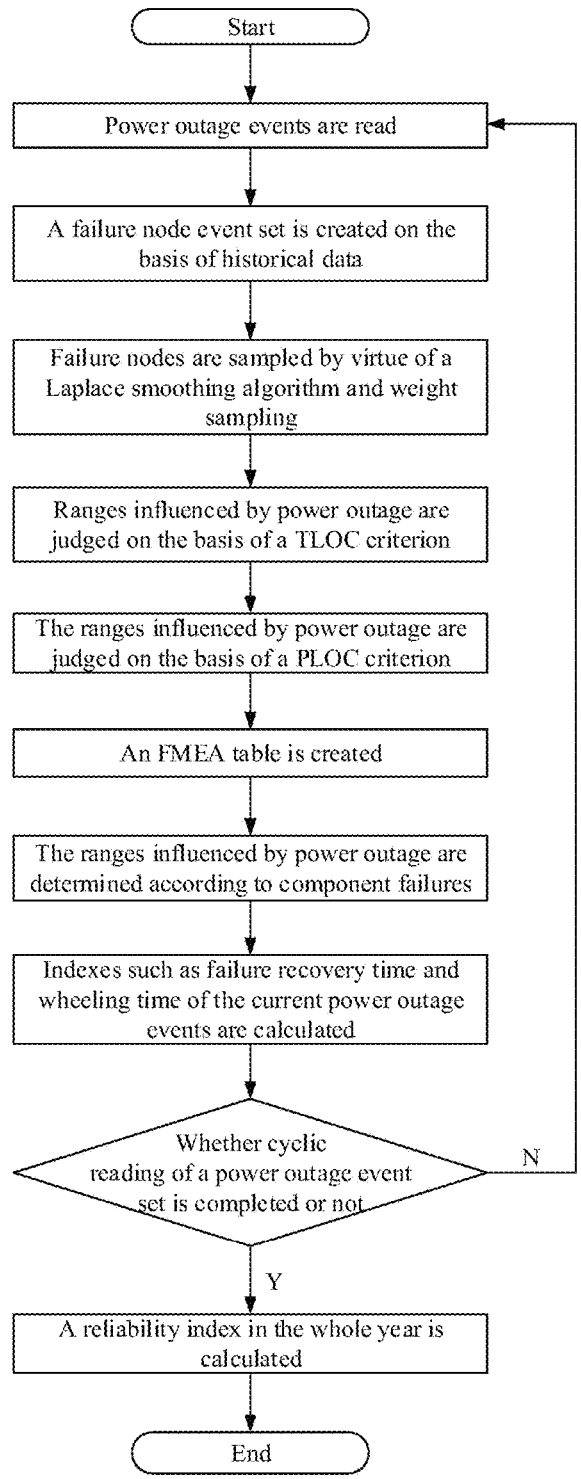
FIG. 7 is a flowchart of calculating a reliability index on the basis of historical failure set sampling in an application example of a prediction method according to an embodiment of the disclosure.

As shown in FIG. 7, calculation of the reliability index on the basis of historical failure set sampling in the application example includes the following steps.

In the step 1, the system is partitioned on the basis of the TLOC and PLOC criterions of a real-time operation condition of the system, the FMEA table (failure mode and effects analysis table), and a whole-year power outage event set is created by virtue of a prediction result of the ARIMA model. A failure component sample set is created for each component on the basis of Laplace smoothing and on the basis of the historical failure information sample set. It is assumed that a component set is E and a historical failure set is S, and then the failure component sample set Re $s_1(e,w)$ is created according to the following rule (where e represents a failure component and w represents a failure probability weight).

For a certain component $e_i$, if it appears in the set S, $w_i$ is its frequency of appearance, and it does not change, the following formula is true:

$$w_i = \begin{cases} \min(w') - 1 & \text{if } \min(w') \geq 1 \\ 1 & \text{if } \min(w') > 1 \end{cases} \quad (6)$$

in the formula, w' is a frequency of all $e \in S$ components and min(w') represents a minimum value of the frequency of appearance of e therein.

In step 2, each power outage event is cyclically read, and a corresponding failure component is simultaneously extracted from the sample set.

In step 3, the FMEA table is read and looked up for load points influenced when the failure component corresponding to the power outage event fails, and information such as power outage frequencies, power outage time and energy not supplied of these load points is recorded. Whether all power outage events are cyclically completed or not is judged, Step 4 is executed if YES, otherwise Step 2 is re-executed.

In step 4, cycling is ended, statistics on load points and reliability index of the system in each simulated year is made, and the reliability index of the whole system is further calculated.

The above embodiments are adopted not to limit but only to describe the technical solutions of the disclosure. Although the disclosure has been described in detail in the embodiments, those skilled in the art may still make modifications or equivalent replacements to specific implementation modes of the disclosure. Any modifications or equivalent replacements made without departing from the spirit and scope of the disclosure fall within the scope of protection of the claims of the disclosure.

INDUSTRIAL APPLICABILITY

The method provided by the embodiments of the disclosure for predicting the operation reliability of the power distribution network includes the following steps.

In step 1, the monthly power outage frequencies of the users in the historical data of the power distribution network system are extracted and preprocessed to obtain the monthly average power outage frequency sequence within the time period.

In step 2, whether the monthly average power outage frequency sequence is a stationary sequence or not is judged.

Step 4 is executed when the monthly average power outage frequency sequence is a stationary sequence.

Step 3 is executed when the monthly average power outage frequency sequence is not a stationary sequence.

In step 3, the monthly average power outage frequency sequence is corrected, and Step 2 is re-executed.

In step 4, the value of the total number of the autoregressive items and the value of total number of moving average items of ARIMA are obtained according to the monthly average power outage frequency sequence.

In step 5, the ARIMA model is established and corrected; and

In step 6, the monthly power outage frequency of the power distribution network system in the recent year is predicted according to the ARIMA model, and the operation reliability index of the power distribution network in the whole year is obtained. In such a manner, accurate prediction and assessment of the reliability of the power distribution network is implemented, planning, design, operation and maintenance of the power distribution network in the future are effectively and accurately guided, and the operation reliability prediction and assessment accuracy of the power distribution network is improved.

The invention claimed is:

1. A method for predicting reliability of operation of a power distribution network, the method being based on an Autoregressive Integrated Moving Average (ARIMA) model, the method comprising:

step 1 of extracting and preprocessing monthly power outage frequencies of users in historical data of a power distribution network system to obtain a monthly average power outage frequency sequence within a time period;

step 2 of judging whether the monthly average power outage frequency sequence is a stationary sequence or not;

executing step 4 when the monthly average power outage frequency sequence is a stationary sequence, and executing step 3 when the monthly average power outage frequency sequence is not a stationary sequence;

step 3 of correcting the monthly average power outage frequency sequence, and re-executing the step 2;

step 4 of obtaining a value of a total number of autoregressive items and a value of a total number of moving average items of ARIMA according to the monthly average power outage frequency sequence;

step 5 of establishing and correcting the ARIMA model; and step 6 of predicting a monthly power outage frequency of the power distribution network system in a recent year according to the ARIMA model, and obtaining an operation reliability index of the power distribution network in a whole year;

wherein extracting and preprocessing the monthly power outage frequencies of the users in the historical data of the power distribution network system to obtain the monthly average power outage frequency sequence within the time period comprises:

step 1-1 of extracting a monthly power outage frequency sequence Y of the users in the historical data of the power distribution network; and step 1-2 of preprocessing the monthly power outage frequency sequence Y to obtain the monthly average power outage frequency sequence $Y_t$ within the time period, using a formula (1);

$$Y_t = \phi_1 Y_{t-1} + \phi_2 Y_{t-2} + \ldots + \phi_p Y_{t-p} + e_t - \theta_1 e_{t-1} - \theta_2 e_{t-2} - \ldots - \theta_q e_{t-q} \quad (1),$$

where $Y_t$ is a monthly average power outage frequency sequence value of moments 0 to t, p is the total number of the autoregressive items of the model, q is the total number of moving average items of the model, e is white noise during each sequence change, ϕ and θ are different unknown parameters to be solved and t is a month number in a calculation window;

wherein judging whether the monthly average power outage frequency sequence is a stationary sequence or not comprises:

judging whether the monthly average power outage frequency sequence is a stationary sequence according to a formula (2) and a formula (3):

$$A_n = \frac{\sum_{i=0}^{n} y_i}{n} = K, \text{ and} \quad (2)$$

$$\gamma_{t,t-k} \approx \gamma_{0,k}, \quad (3)$$

where $A_n$ is a constant and represents an average value of the monthly power outage frequencies, n is a number of samples of monthly average power outage, $\gamma_{t,t-k} \approx \gamma_{0,k}$ represents that covariances of sequences $Y_{t-k}$ and $Y_t$ and sequences Y and $Y_k$ are approximate, k is a parameter k making the formula (3) true at any moment, K represents a constant and t is the month number in the calculation window;

executing the step 4 when both the formula (2) and the formula (3) are true; and executing the step 3 when any one of the formula (2) and the formula (3) is false.

2. The method according to claim 1, wherein correcting the monthly average power outage frequency sequence comprises:

modifying a time frequency of the monthly average power outage frequency sequence, or performing logarithmic differentiation on the monthly average power outage frequency sequence.

3. The method according to claim 2, wherein obtaining the value of the total number of the autoregressive items and the value of the total number of moving average items of ARIMA according to the monthly average power outage frequency sequence comprises:

step 4-1 of establishing an autocorrelation function and partial autocorrelation function of the monthly average power outage frequency sequence;

step 4-2 of solving the autocorrelation function and partial autocorrelation function of the monthly average power outage frequency sequence to obtain a set of the value of the total number of the autoregressive items and the value of the total number of moving average items of the ARIMA model;

step 4-3 of establishing an Akaike Information Criterion (AIC) function (4):

$$AIC = n \log \sigma^2 + 2(p+q) \quad (4),$$

where n is a sample number of monthly average power outage, σ is a residual square sum, p is the total number of the autoregressive items of the model and q is the total number of moving average items of the model; and step 4-4 of screening $p_m$ and $q_m$ making a value of AIC minimum as final values of the total number p of the autoregressive items and the total number q of moving average items, $p_m$ is a certain value in the value set of the total number p of the autoregressive items and $q_m$ is a certain value in the value set of the total number q of moving average items, m is a serial number of the element with a minimum value in set P and set Q, set P is the value set of the total number p, set Q is the value set of the total number q.

4. The method according to claim 3, wherein establishing and correcting the ARIMA model comprises:

step 5-1 of performing regression analysis on the value of the total number of the autoregressive items and the value of the total number of moving average items according to a least square method to obtain a prototype of the ARIMA model; and step 5-2 of detecting a residual sequence of the prototype, when the residual sequence is white noise, determining that the prototype is a final type of the ARIMA model and establishment of the ARIMA model is completed, and when the residual sequence is not the white noise, re-executing the step 5-1.

5. The method according to claim 4, wherein predicting the monthly power outage frequency of the power distribution network system in the recent year according to the ARIMA model and obtaining the operation reliability index of the power distribution network in the whole year comprises:

step 6-1 of predicting and extracting the monthly power outage frequency of the power distribution network system in the recent year according to the ARIMA model, and creating a historical failure information sample set;

step 6-2 of creating a Laplace smoothing failure component sample set according to the historical failure information sample set, and obtaining power outage frequencies, power outage time and energy not supplied of de-energized load points; and step 6-3 of obtaining the operation reliability index of the power distribution network in the whole year.

6. The method according to claim 5, wherein predicting and extracting the monthly power outage frequency of the power distribution network system in the recent year according to the ARIMA model and creating the historical failure information sample set comprises:

step a of partitioning the power distribution network system on the basis of a Total Loss Of Continuity (TLOC) criterion and Partial Loss Of Continuity (PLOC) criterion of a real-time operation condition of the power distribution network system, and creating a Failure Mode and Effects Analysis (FMEA) table; and step b of solving the ARIMA model to obtain the predicted monthly power outage frequency of the power distribution network system in the whole year, and creating the historical failure information sample set.

7. The method according to claim 6, wherein creating the Laplace smoothing failure component sample set according to the historical failure information sample set and obtaining the power outage frequencies, power outage time and energy not supplied of the de-energized load points comprises:

step c of creating the Laplace smoothing failure component sample set Re $s_1(e,w)$ according to the historical failure information sample set, wherein it is assumed that a component sample set is E and a historical failure set is S, and then the failure component sample set Re $s_1(e,w)$ is created according to the following rule:

for a certain component $e_i$, if a frequency of appearance in the historical failure set S is $w_i$ and does not change, the following formula (5): is true:

$$w_i = \begin{cases} \min(w') - 1 & \text{if } \min(w') \geq 1 \\ 1 & \text{if } \min(w') > 1 \end{cases}, \quad (5)$$

where w' is a frequency of all e∈S components, min(w') represents a minimum value of the frequency of appearance of e therein, e represents a failure component and W represents a failure probability weight, i is a serial number of the elements in the set E and set S;

step d of cyclically reading each power outage event in the failure component sample set, and simultaneously extracting a corresponding failure component from the failure component sample set;

step e of reading and look up the FMEA table for the de-energized load point influenced when the failure component corresponding to the power outage event fails;

step f of recording the power outage frequency, power outage time and energy not supplied of the de-energized load point; and step g of judging whether all power outage events in the failure component sample set are cyclically completed or not, executing the step 6-3 when all power outage events in the failure component sample set are cyclically completed, and re-executing the step d when all power outage events in the failure component sample set are not cyclically completed.

8. The method according to claim 7, wherein obtaining the operation reliability index of the power distribution network in the whole year comprises:

step h of making statistics on the power outage frequency, power outage time and energy not supplied of each de-energized load point; and step i of calculating the operation reliability index of the power distribution network system in the whole year.

* * * * *